United States Patent [19]

Parks

[11] 4,253,594

[45] Mar. 3, 1981

[54] ANCHOR STRAP

[76] Inventor: Robert P. Parks, 114 W. Ave. A, Key Largo, Fla. 33037

[21] Appl. No.: 35,914

[22] Filed: May 4, 1979

[51] Int. Cl.$^3$ .................... B60R 9/04

[52] U.S. Cl. .................... 224/318; 224/329; 248/505; 410/97; 410/101

[58] Field of Search .................... 24/68 CD, 16 R, 17 R; 224/311, 318, 329, 330; 280/179 R, 179 A, 179 B, 769; 105/469, 473, 475, 466; 296/95 R; 248/505; 410/101, 97

[56] References Cited

U.S. PATENT DOCUMENTS

| | | | |
|---|---|---|---|
| 2,196,341 | 4/1940 | Rush . | |
| 3,722,911 | 3/1973 | Rhody | 280/179 R |

FOREIGN PATENT DOCUMENTS

| | | | |
|---|---|---|---|
| 1127972 | 12/1956 | France | 224/311 |
| 1296880 | 11/1972 | United Kingdom | 224/311 |

*Primary Examiner*—Roy D. Frazier
*Assistant Examiner*—Alexander Grosz
*Attorney, Agent, or Firm*—John Cyril Malloy

[57] ABSTRACT

An anchor strap for use in securing an object to another object having a frame defining an opening and a swingable member for swinging movement into opening and closing relation of the opening and which includes a keeper to engage the frame to hold the swingable member in closing relation, an anchor strap which is composed of a strip of flexible pliable material relatively non-elastic, such as of cloth or plastic or rubber, having a first end and a second end and a loop at each of the ends and in one of the ends a core of solid material within the loop and the free end being adapted to be used to tie to an object, the strip being of an overall length of 3 inches to 3 foot and preferably about 8 to 10 inches long.

1 Claim, 4 Drawing Figures

12
22
22'
52
50
20
54

ANCHOR STRAP

FIELD OF THE INVENTION

This invention relates to an anchor strap.

BACKGROUND OF THE INVENTION:

Quite often it is desired to transport articles on cars; and this is often difficult because such items are sometimes clumsy and difficult to secure to a car. This invention is of an anchor strap which finds special use in providing a means for carrying articles, such as large pieces of plywood, on the top of a vehicle, as shown in the drawings.

Generally speaking, the invention is of an anchor strap, as shown in FIG. 1 which has opposite ends which are looped and one end of which is sized to receive within the loop a core which can be anchored within the frame once the door is closed, such as the trunk, engine compartment lid, or side doors, as shown in the drawings, and whereby the free end may be connected to a similar anchor strap by means of a tie rope and over an object as shown in the drawings.

OBJECTS OF THE INVENTION

It is an object of this invention to provide an anchoring device or strap of the type described hereinafter which is useful in transporting items on cars, as well as in supporting things, such as from a closed door within a building, or any type of frame which has a swingable member connected to it, which is simple and inexpensive to manufacture, easily installed, and readily adapated for the purposes which are more apparent hereinafter.

In accordance with these and other objects which will become apparent hereinafter, the instant invention will be described with reference to the accompanying drawings in which:

Figure 1:
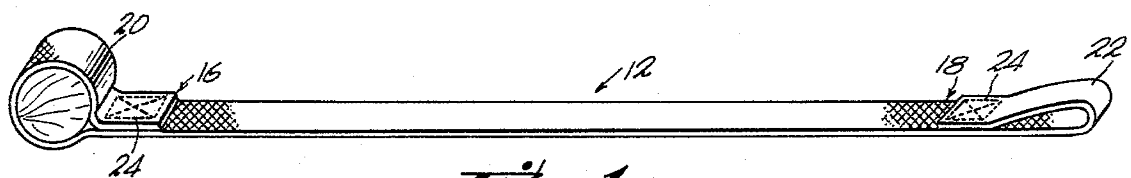
FIG. 1 is a perspective view of an anchor strap in accordance with this invention.
Figure 2:
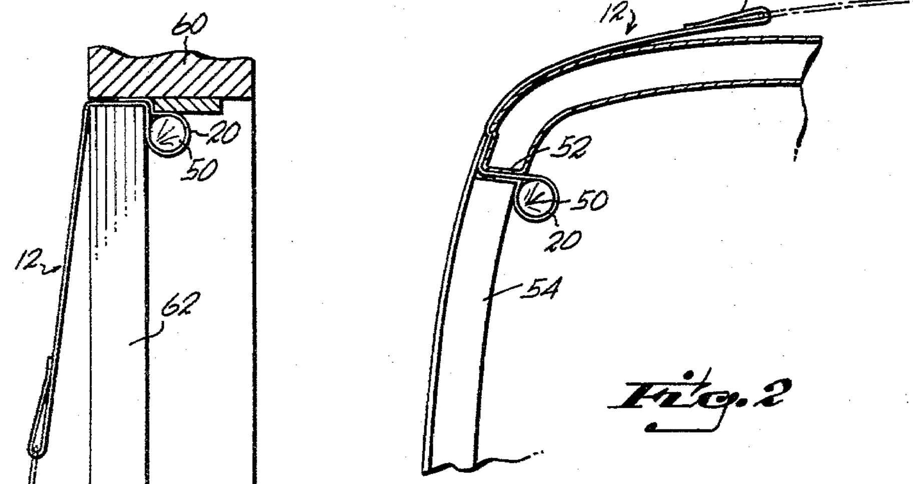
FIG. 2 is a view taken on the plane indicated by the line 2—2 of FIG. 3 and looking in the direction of the arrows.
Figure 5:
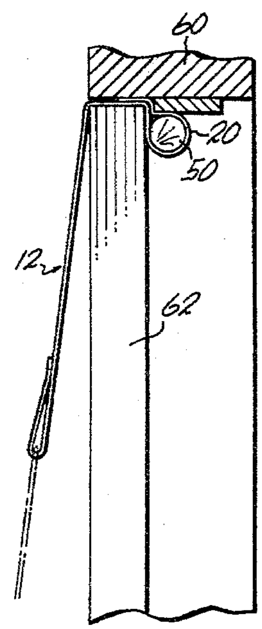
FIG. 5 is a view similar to FIG. 2 illustrating a door which is closed, such as in a house or apartment.
Figure 3:
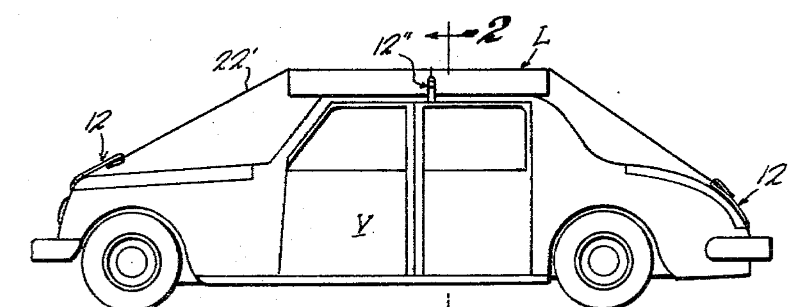
FIG. 3 is a view illustrating the use of the anchor strap in securing a load to a vehicle.
Figure 4:
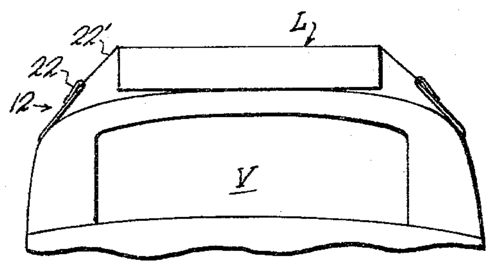
FIG. 4 is a view taken from the rear of FIG. 3.

DESCRIPTION OF THE PREFERRED EMBODIMENT:

Referring to the drawings wherein like reference characters designate like or corresponding parts throughout the several views and referring particularly to FIG. 1, there is shown an anchor strap which is generally designated by the numeral 12. It is seen that it is composed of a strip of flexible pliable relatively non-elastic material, such as a heavy cloth, canvas, plastic or rubbery material. It has a first end 16 and a second end 18 which are looped defining the loops as indicated by the numerals 20 and 22 which may be formed by folding the ends back upon themselves and stitching them securely as indicated by the seam lines 24 in FIG. 1 to the adjacent strip ends, such as 16. The strip is used as shown in FIG. 3 for securing a load L to a vehicle V, the anchor straps being designated by the numeral 12 and 12"in FIG. 3. More specifically, the anchor straps are shown in position in FIG. 2 wherein it is seen that a core 50 is snugly received within the loop 20 of the device shown in FIG. 1 and that it is captivated by the frame 52 and the swingable member or door 54, that is, within the interior of the vehicle, with the relatively thin strap length extending through the space between the swinging door and the frame with the extending end 22 being adapted to be connected to a tie member 22'looped through it. An alternative illustration of the use of the invention is shown in FIG. 5 wherein the frame of a doorway 60 is shown with a swingable member 62 arranged for swinging movement in a conventional fashion into opening and closing relation of the frame. The device 12 is again shown, with the looped end bearing the core being secured and captivated against forces applied longitudinally of the extending end of the anchor strap.

It is thus seen that there has been provided a simple and inexpensive and highly useful readily installable device for use in attaching loads to a vehicle or other frame having a swingable member adapted for swinging movement into opening and closing relation of a doorway.

It will be recognized that departures may be made within the spirit and scope of this invention which is, therefore, not to be limited except as the claims set forth hereinafter in accordance with the doctrine of equivalents.

What is claimed is:

1. In combination, a vehicle and a plurality of anchor straps, said anchor straps being adapted for securing an object to the vehicle, said vehicle having a top and a frame, said frame defining opposed sides and an interior and each of said frame sides having an opening in the frame, a swingable access door to the interior of the vehicle normally nested in closing relation of each of said openings, mutually intercooperating means on each of the doors and frame at each of the openings to hold each of the doors in said normally nested closing relation; and each of said anchor straps of said plurality comprising a strip of flexible pliable relatively thin, relatively non-elastic material having a first end and a second end, loop means defined at the first end and a core of solid material in the loop at said first end, the second end of said strip being spaced from said first end a distance of between 3 inches and 3 feet;

and tie means extending from and connected to the second end of each anchor strap for tying engagement about an object positioned on the top of the vehicle with said loop and solid core at each of said first ends being captivated at the opening by its associated door within the frame when the access doors are in closing relation of their associated openings with each of said anchor straps extending from the frame and with said tie means captivating said object to the vehicle top.

* * * * *